United States Patent [19]

Leigh-Monstevens et al.

[11] Patent Number: 4,719,444

[45] Date of Patent: Jan. 12, 1988

[54] HYDRAULIC MASTER CYLINDER SWITCH

[75] Inventors: Keith V. Leigh-Monstevens, Troy; Richard A. Nix, Rochester Hills, both of Mich.

[73] Assignee: Automotive Products plc, Warwickshire, England

[21] Appl. No.: 878,121

[22] Filed: Jun. 25, 1986

Related U.S. Application Data

[63] Continuation-in-part of Ser. No. 590,168, Mar. 16, 1984, abandoned.

[51] Int. Cl.⁴ .................................................. H04Q 1/00
[52] U.S. Cl. ...................................... 340/71; 200/61.89
[58] Field of Search ........................... 92/129; 60/545; 200/61.89, 61.9, 61.91, 5 R; 192/85 CA, 99 S, 91 R; 340/52 R, 52 F, 53, 71

[56] References Cited

U.S. PATENT DOCUMENTS

| | | | |
|---|---|---|---|
| 2,050,897 | 8/1936 | Rockwell | 200/61.89 |
| 2,276,028 | 3/1942 | Dick | 200/61.89 |
| 2,278,579 | 4/1942 | Bluemle | 200/61.89 |
| 2,349,345 | 5/1944 | Goepfrich | 92/129 X |
| 2,374,235 | 4/1945 | Roy | 92/129 X |
| 2,396,155 | 3/1946 | Christensen | 92/129 X |
| 2,405,093 | 7/1946 | La Brie | 92/129 |
| 3,257,522 | 6/1966 | Raab | 200/61.89 |
| 3,411,133 | 11/1968 | Gardner | 200/61.89 X |
| 3,794,147 | 2/1974 | Shellhause | 200/61.89 X |

Primary Examiner—Ulysses Weldon
Attorney, Agent, or Firm—Krass & Young

[57] ABSTRACT

A switch mounted on the linearly displaceable input member of a hydraulic master cylinder and operable by displacement of the input member relative to the cylinder. An end of the switch housing engages the end of the cylinder through which the input member projects and the engaged surfaces are correspondingly spherically shaped to permit limited swiveling motion of the input member relative to the cylinder without affecting the operation of the switch.

5 Claims, 5 Drawing Figures

HYDRAULIC MASTER CYLINDER SWITCH

CROSS-REFERENCED TO RELATED APPLICATIONS

The present application is a continuation-in-part of application Ser. No. 590,168, filed Mar. 16, 1984 now abandoned, and assigned to the same assignee as the present application.

BACKGROUND OF THE INVENTION

The present invention relates to an electrical switch operated by the input member of a hydraulic master cylinder, such as the master cylinder of a motor vehicle clutch hydraulic control system, the master cylinder of a motor vehicle hydraulic brake system, and the like.

An electrical switch is often associated with the master clyinder of motor vehicle hydraulic brake systems for the purpose of, for example, energizing the electrical circuit turning on the motor vehicle stop signal lights, and/or for operating a cruise control system from an active mode to an inactive mode, upon application of the brakes by the driver. Such electrical switches are generally of the pressure operated type. They are operated by the increase of hydraulic fluid pressure when the brake pedal is displaced such as to cause a corresponding displacement of the master cylinder piston, thus increasing the pressure of the hydraulic fluid in the master cylinder in front of the piston. Pressure-operated switches are costly to manufacture and they must be installed, at least partly, within the master cylinder. They are often unreliable as they must be activated by a slight increase in the hydraulic fluid pressure for providing an appropriate stop signal even upon slight application of the brakes or for disconnecting the cruise control system as a result of a slight foot tap on the brake pedal.

The functioning of pressure actuated switches may be somewhat erratic under certain conditions, such as hydraulic fluid back pressure surges in the master cylinder caused, for example, by heat expansion of the brake linings and of the hydraulic fluid. Such erratic functioning of pressure-actuated switches causes erratic turning on and off of the motor vehicle stop signal lights, particularly irritating to the driver of a motor vehicle immediately following.

Hydraulic control apparatus for motor vehicle mechanical clutches are rapidly becoming the standard of the industry for operating the clutch release mechanism of a motor vehicle provided with a mechanical clutch and a conventional manually shiftable transmission or gearbox. Examples of such hydraulic control systems for mechanical clutches are disclosed in U.S. Pat. Nos. 4,407,125, 4,585,108, 4,585,109, 4,585,106 and 4,585,107, and in co-pending applications Ser. Nos. 376,248, 537,869, 555,667, and 555,666, all assigned to the same assignee as the present application. It has become general practice in the automobile industry to interlock the operation of the engine starter motor with other controls of the motor vehicle such that the starter motor is rendered inoperative unless the transmission is in neutral or park in motor vehicles provided with an automatic transmission or, in motor vehicles provided with a foot-operated clutch and a manually operated gearshift transmission, unless the transmission is in neutral and/or the clutch pedal is fully depressed to fully release the clutch. In addition, it is convenient, in motor vehicles provided with a cruise control and a mechanical clutch, to shut off the operation of the cruise control upon, for example, down shifting which in turn requires release of the clutch. However, it is desirable that the cruise control be disconnected even before the clutch is fully released, to enable the driver to cut off the cruise control by a slight foot tap on the clutch pedal, and perhaps to discourage "riding" the clutch, i.e. resting one's foot on the clutch pedal at all times.

In prior application Ser. No. 590,168, there is disclosed a mechanically actuated limit switch, mounted on the input member of a hydraulic control apparatus, such as a clutch hydraulic control or a hydraulic brake control, which is directly operated by the master cylinder input member.

SUMMARY OF THE INVENTION

The present invention is an improvement of such a mechanically actuated limit switch, mounted on the input member of the master cylinder and provided with swiveling abutment means engaged with the end of the master cylinder such that the switch is accurately actuated irrespective of slight angular motion of the input member during operation of the master cylinder by the clutch pedal.

DETAILED DESCRIPTION OF THE PREFERRED EMBODIMENT

Figure 1:
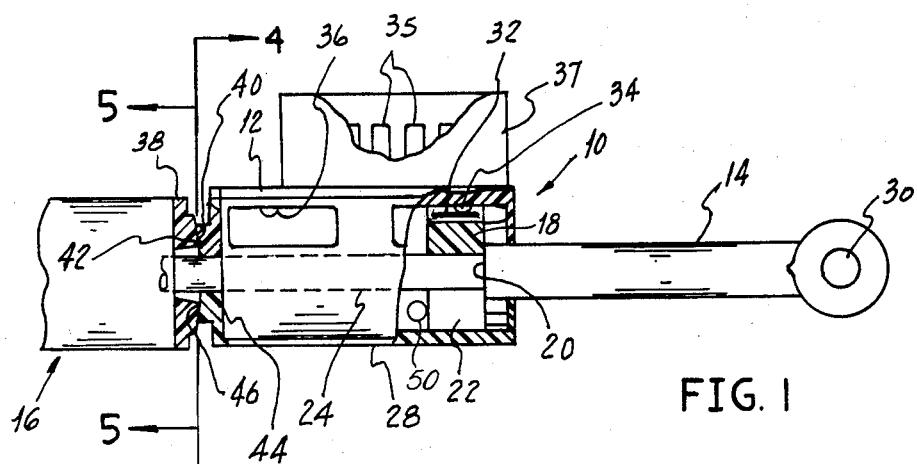
FIG. 1 is a partial elevational view with portions broken away of a hydraulic master cylinder and input member assembly, such as the master cylinder of a motor vehicle clutch hydraulic control system, provided with an electrical switch according to the present invention.
Figure 2:
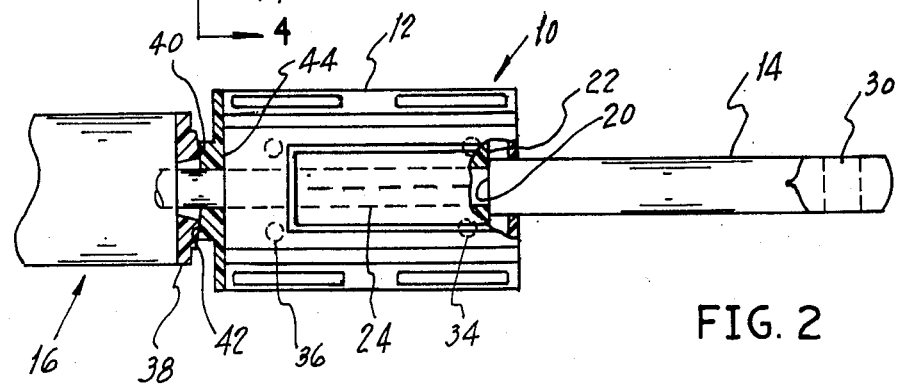
FIG. 2 is a top plan view thereof.

Referring to FIGS. 1 and 2 of the drawing, the present invention comprises an electrical switch 10 disposed in a housing 12, made of dielectric plastic material, which is mounted on the input member or rod 14 projecting from the end of a hydraulic cylinder 16, such as, for example, the master cylinder of a motor vehicle clutch control apparatus. The master cylinder 16 is in fluid communication with a slave cylinder, not shown, via an appropriate conduit, such that when the input member or push rod 14 of the master cylinder 16 is moved longitudinally into the master cylinder 16, hydraulic fluid displaced by a piston, not shown, disposed in the master cylinder 16 is transferred from the master cylinder to the slave cylinder, the output member of the slave cylinder being arranged to operate the clutch release mechanism.

A slide 18 is disposed within the switch housing 12, and is actuated, against the action of a return coil spring 50, by the cylinder input member or push rod 14 having a shoulder 20 engaged with one side of the slide 18. The slide 18 is substantially horseshoe-shaped, being provided with a cut-out portion 22 through which is passed the reduced diameter portion 24 of the push rod 14 beyond the shoulder 22. The switch housing 12 has a corresponding cut-out portion 26 which is normally covered by a cover plate 28, once the switch 12 is installed in position around the reduced diameter portion 24 of the push rod 14. As is known in the art, the free end of the input member or push rod 14 is enlarged and provided with an eye 30 for pivotal connection to clutch pedal, not shown, such as when the clutch pedal is depressed, the input member or push rod 14 is displaced from its home position, FIG. 1, of fully engaged clutch, to the position of FIG. 3 of full clutch release. In the position of FIG. 1, a pair of stationary contacts 34 in the switch housing 12 are engaged by a spring-biased blade contact member 32 held by the slide 18. The pair of contacts 34 close a circuit such as, for example, cruise control enabling circuit, with the result that in the home position of FIG. 1 of full clutch engagement, the motor vehicle cruise control may be turned on. A tap on the clutch pedal momentarily displaces the input member 14 on the slide 18 to the left, and as seen in the drawing, consequently causes the blade contact member 32 to disengage from the fixed contacts 34, with the result that the cruise control circuit is disabled.

Figure 3:
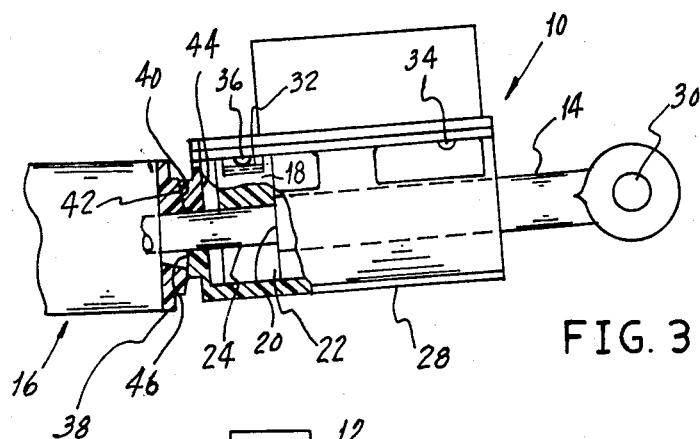
FIG. 3 is a view similar to FIG. 1 but showing the assembly in a position corresponding to a full release of the clutch.
Figure 4:
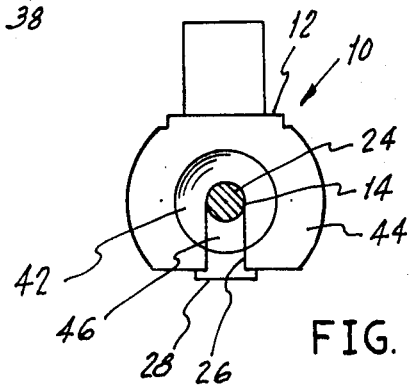
FIGS. 4 and 5 are views respectively from lines 4—4 and 5—5 of FIG. 1.
Figure 5:
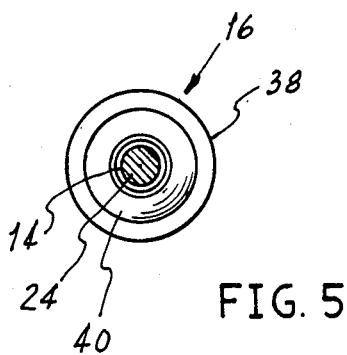

In the position of FIG. 3 of the input member or push rod 14, corresponding to full release of the clutch mechanism, the slide 18 has been displaced by the input member or push rod 14, against the action of the return spring 50, to a position causing the blade contact 32 to close a circuit between a pair of contacts 36 fixedly disposed in the housing 12. The contacts 36 being in the vehicle starter relay circuit, the motor vehicle engine may be started, with the clutch fully disengaged. The contacts 32 and 36, and any other contacts in the switch 10, are internally connected to the blades 35 in a socket 37 for connection, by means of a plug and electrical harness, not shown, to appropriate circuits operated by the switch 10.

In the course of its linear movement from its home position of FIG. 1 of fully engaged clutch to the clutch fully disengaged position of FIG. 2, due to the linkage between the clutch pedal causing the eye 30 on the end of the input member or push rod 14 to be displaced along an arc of a circle, the input member or push rod 14 is angularly displaced from being substantially aligned with the longitudinal axis of the master cylinder 16 to an angle to the master cylinder longitudinal axis, FIG. 3, thus causing the switch housing 12 to also be displaced from a position wherein its longitudinal axis is aligned with the longitudinal axis of the master cylinder 16, FIG. 1, to a position wherein its longitudinal axis is at an angle to the longitudinal axis of the master cylinder 16. Swiveling motion of the input member of push rod 14 relative to the longitudinal axis of the master cylinder 16 is allowed by a spherical connection between the end of the input member or push rod 14 and the cylinder piston, not shown, and the clearance provided for that purpose between the spherical surfaces in engagement.

The master cylinder 16 is closed, at its end through which passes the reduced diameter portion 24 of the input member or push rod 14, by an end cap 38 having a convex spherical surface 40, and the corresponding end of the switch housing 12 has a correspondingly concave spherical surface 42, with the result that a swiveling abutment is provided between the end of the master cylinder 16 and the end of the switch housing 12. The conforming spherical surfaces 40 and 42 in engagement allow relative swiveling motion between the switch housing 10 and the master cylinder end cap 38, thus permitting accurate positional engagement of the sliding blade contact 32 held by the switch slide 18 with respect to the fixed contacts 34, FIG. 1, and the fixed contacts 36, FIG. 3, irrespective of the angular position of the input member or push rod 14 relative to the fixed longitudinal axis of the master cylinder 16.

With the arrangement of the invention, it is not necessary to install the master cylinder 16 in a pivotal position in order to determine accurately the positional operation of the switch 10. The master cylinder 16 may be installed, as conventionally done, through a mounting aperture in the vehicle firewall, for example by way of a mounting flange formed integral with the cylinder housing. The swiveling abutment provided between the end of the switch housing 12 and the end of the master cylinder 16 by forming the end cap of the cylinder with a convex spherical surface 40 and the end of the switch housing 12 with a corresponding concave spherical surface 42 enables the cylinder input member or push rod 14 and the switch housing 12 mounted thereon to angulate within a few degrees from the center line of the master cylinder 16 without causing corresponding displacement of the switch slide 18 relative to the switch housing 12, as would be the case if the abutting surfaces between the cylinder end cap and the switch housing were planar. It will be appreciated by those skilled in the art that the spherical surfaces on the end of the cylinder end cap 38 can be made concave, while the spherical surface on the end of the switch housing 12 can be made convex, without departing from the spirit of the invention. It will also be appreciated that in the structure illustrated the switch housing end spherical surface 42 is partly formed in an end plate 44 closing the housing 10 and partly formed in a flange 46 at an end of the cover plate 28, and that the spherical surfaces 40 and 42 are constantly in engagement due to the spring bias within the switch 10.

It will be further appreciated that the master cylinder 16 may be a hydraulic brake master cylinder and that the switch 10 may be arranged to disable a cruise control system via the contacts 32, while the contacts 36 may be replaced by longitudinally elongated contacts providing closure of the tail light circuit upon applying the brakes.

Having thus described the present invention by way of a structural example thereof, well-designed to accomplish the objects of the invention, modifications whereof will be apparent to those skilled in the art, what is claimed as new is as follows:

1. In combination with a hydraulic master cylinder having a linearly displaceable input member, wherein said input member has a longitudinal axis disposed at a progressively variable angle relative to the longitudinal axis of said master cylinder during displacement of said input member from a home position to an operative position, an electrical switch including a hollow housing positioned around said input member and slidably passing said input member and switching means within said housing operable by said input member during displacement of said input member from said home position to said operable position, said cylinder having an abutment end surface and one end of said switch housing being provided with an end abutment surface in engagement wtih said cylinder abutment surface, said abutment surfaces being formed as complementary spherical surfaces whereby angulation of said switch housing relative to the longitudinal axis of said master cylinder is allowed.

2. The improvement of claim 1 wherein the spherical abutment surface on said cylinder is convex and the spherical abutment surface on said one end of said housing is concave.

3. The combination according to claim 1 wherein said switch further includes spring means operative to continuously urge said complementary spherical surfaces together.

4. The combination according to claim 3 wherein said switching means includes a slide member mounted on said input member and slidable within said housing, contact means on said slide member, and fixed contacts on said housing for coaction with said contact means.

5. The combination according to claim 4 wherein said input member includes a shoulder, said slide member is slidably mounted on said input member between said shoulder and said one end of said housing, and said spring means is positioned within said housing between said slide member and said one end of said housing so as to urge said slide member against said shoulder and urge said complementary spherical surfaces together.

* * * * *